United States Patent [19]
Kraft et al.

[11] Patent Number: 5,139,371
[45] Date of Patent: Aug. 18, 1992

[54] CLAMP FOR CIRCULAR CUTTING TOOL

[75] Inventors: Harald Kraft, Niedereschach; Otto Eder, Köngen, both of Fed. Rep. of Germany

[73] Assignee: Feldmuehle Aktiengesellschaft, Düsseldorf, Fed. Rep. of Germany

[21] Appl. No.: 635,174
[22] PCT Filed: Jul. 13, 1989
[86] PCT No.: PCT/EP89/00811
  § 371 Date: Feb. 1, 1991
  § 102(e) Date: Feb. 1, 1991
[87] PCT Pub. No.: WO90/00457
  PCT Pub. Date: Jan. 25, 1990
[51] Int. Cl.⁵ .................................. B23B 29/12
[52] U.S. Cl. .................. 407/101; 407/46; 407/107; 408/714
[58] Field of Search .................. 407/8–10, 407/46, 47, 101, 102, 107, 109–111; 408/714

[56] References Cited

U.S. PATENT DOCUMENTS 4,111,587  9/1978  Hatanaka ............... 407/109 X
4,456,408  6/1984  Glasow ................... 407/46 X
4,552,491  11/1985 Parker .................... 407/107
4,893,967  1/1990  Briese .................... 407/46 X

FOREIGN PATENT DOCUMENTS 1136185  9/1962  Fed. Rep. of Germany .
2260097  6/1974  Fed. Rep. of Germany .

Primary Examiner—Steven C. Bishop
Attorney, Agent, or Firm—Felfe & Lynch

[57] ABSTRACT

A clamp for circular cutting tools (2) has a bearing bore (6) at the clamp head (5) in order to support a cup-shaped insert (7). The receptacle (9) of the cup-shaped insert (7) is elastically deformable and has a recess configured as a truncated hollow cone and the centering profile (3) of the circular cutting tool (2) is configured as a truncated cone. The convergin cone angle of the recess in receptacle (9) is smaller than the cone angle of the centering profile (3). Several cuts (10) separate the receptacle (9) in spring segments (11). The bottom (12) of the recess has a larger diameter than the contact surface (13) of the circular cutting tool (2). It is provided with a circular groove (14) running along its periphery.

8 Claims, 8 Drawing Sheets

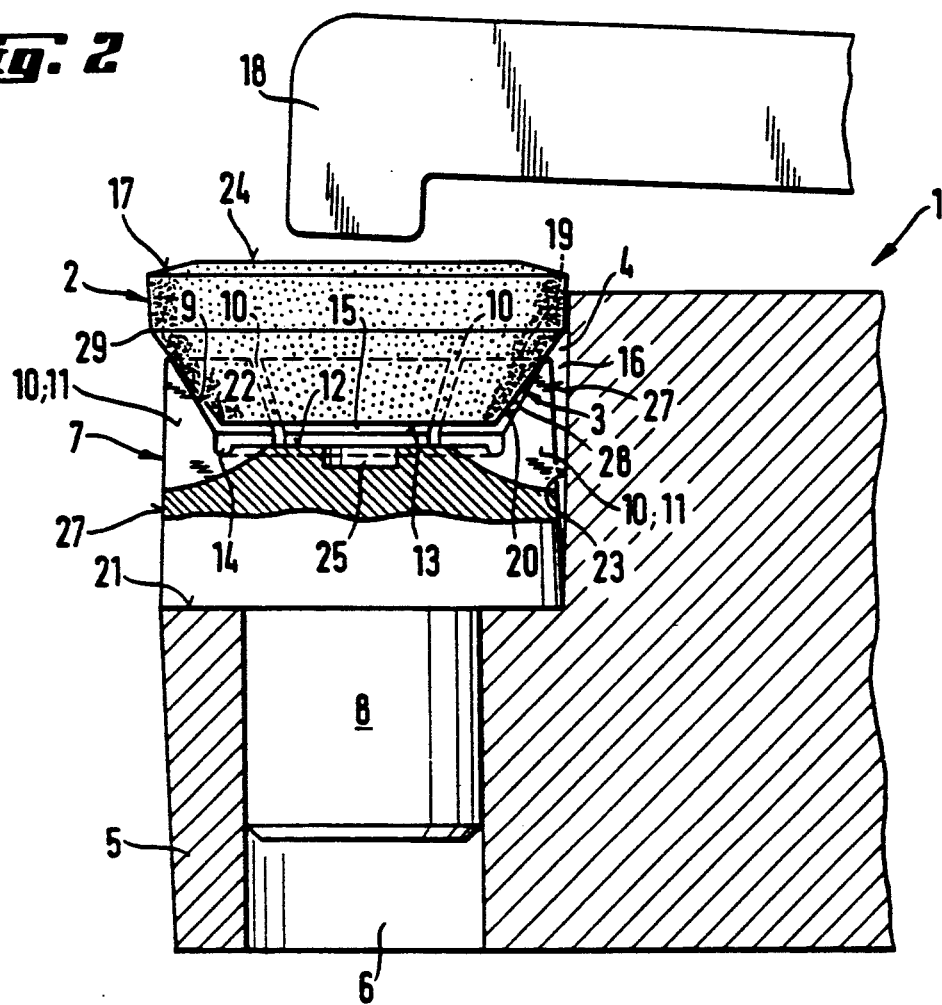
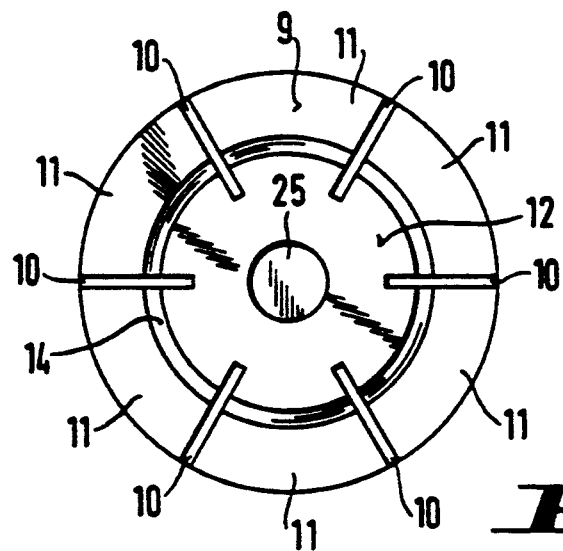

CLAMP FOR CIRCULAR CUTTING TOOL

BACKGROUND OF THE INVENTION

The invention relates to a clamp having a clamp head which is provided with a recess for holding a circular cutting tool, the bottom side of which has a centering profile which engages the complementary recess of the clamp.

DE-AS 11 36 185, GB Patent Nos. 465,537 and 1,094,614, and DE-OS 22 60 097 disclose clamps for circular cutting tools. It is common to all specifications that centering is done simultaneously with the clamping of the circular cutting tools. Hence, the circular cutting tools are provided with recesses having the form of truncated cones (DE-AS 11 36 185), or with centering projections at the bottom in the form of spherical segments (GB Patent No. 465,537), truncated cones (GB Patent No. 1,094,614 and DE-OS 22 60 097), or truncated pyramids (DE-OS 22 60 097). The corresponding recesses in the clamp must be configured complementarily so as to ensure a correct fit of the circular cutting tool.

Fits in the form of spherical segments and corresponding spherical recesses are difficult to manufacture, if a close fit is to be ensured. The same applies to pyramidal recesses. Truncated cones and the corresponding conic recesses involve the most simple way of manufacturing. Theoretically, this solves the problem of a centered fastening. However, practice has shown that manufacture requires observance of prescribed tolerances and for economical reasons these tolerances are kept in a broad range. Consequently, an exact fitting between the centering piece of the circular cutting tool and the conic recess in the supporting part can only be achieved if all tolerances are zero or if plus and minus tolerances of cone and conic bore equal zero. In other words, it is unlikely that the circular cutting tool has full contact fit and at the same time is guided free of play at the cone.

SUMMARY OF THE INVENTION

Hence, it is the object of the present invention to permit a centered clamping of circular cutting tools while the circular cutting tools rest firmly and evenly on the bottom of a conic recess in a receptacle after clamping. At the same time, a contact of the receptacle with parts of the clamp permits centering and guiding the circular cutting tool. For circular cutting tools of the kind known, this object is achieved by providing the clamp head with a bearing bore to support a cup-shaped insert having a cylindrical projection which engages the bearing bore. The cup-shaped insert has a receptacle made of an elastically deformable material, the receptacle having a recess which is configured as a truncated hollow cone. The centering profile of the circular cutting tool is configured as a truncated cone; the converging cone angle of the recess is by 1 to 5 degrees smaller th an the one of the centering profile.

Providing an additional element, the cup-shaped insert permits using an inexpensive material for the manufacture of the clamp and employing high-duty, elastic material only for the cup-shaped insert. Moreover, this permits to significantly simplify the manufacture since the cup-shaped insert is basically lathe work which is easy to manufacture. The same simple but high-precision manufacture applies to the bearing bore in the clamp.

The cup-shaped insert has a cylindrical projection which is inserted in the bearing bore of the clamp and a receptacle which is disposed on top of the bore to support the truncated cone i.e. the centering profile of the cutting tool. The basic difference, however, as compared to prior art, is that the converging cone angle of the conic recess in the receptacle is smaller than the converging cone angle of the centering profile such that while inserting the circular cutting tool, the surface of the latter does not contact the bottom of the recess and there is an annular contact made between the rim of the recess and the surface of the truncated cone. Due to the small difference between the two conical angles, 1 to 5 degree, the play between the recess and the circular cutting tool contact surface is at a minimum. However, since the receptacle is elastically deformable, the recess rim opens up when the circular cutting tool is pressed into the recess. The truncated cone, which is guided by the interior conic wall of the recess, slides downward and is pressed on the bottom of the recess by the contact pressure of the clamping shoe and its position is fixed.

If a greater elastic deformability is desired, e.g. to compensate cone angle differences, the invention provides in a preferred embodiment that the receptacle be separated by cuts into spring segments.

A preferred embodiment of the invention provides that the cylindrical projection has a thread which engages in the bearing bore which, in this case, also has a thread. The cup-shaped insert can be easily mounted by screwing it in the clamp head.

In a preferred embodiment of the invention, the cylindrical projection is configured as a screw which penetrates the receptacle of the cup-shaped insert and the bore of the clamp. The cup-shaped insert is guided either by the cylindrical screw head or by a cylindrical projection below the screw head.

In an advantageous embodiment of the invention the bottom of the recess has a circular groove along its periphery. The cuts extend advantageously through the funnel walls to this circular groove. The circular groove supports the edge of the contact surface of the circular cutting tool so as to avoid a contact with the latter. Extending the cuts to the circular groove, or even farther if necessary, supports the spring effect of the spring segments, i.e. the spring force is extended to a larger area of the segments.

Advantageously, the receptacle includes at least six spring segments having a preferred width between 0.4 and 13.0 mm. A separation of the receptacle into six spring elements ensures an almost complete contact with the surface of the truncated cone of the circular cutting tool. The restriction of the width of the spring segments together with the material selected for the cup-shaped insert provide the necessary spring force.

BRIEF DESCRIPTION OF THE DRAWINGS

FIG. 2 shows a vertical section of the configuration of FIG. 1 before clamping with the clamping shoe, FIG. 3 is a top view of the cup-shaped insert of FIG. 1.

DETAILED DESCRIPTION OF THE PREFERRED EMBODIMENTS

Figure 1:
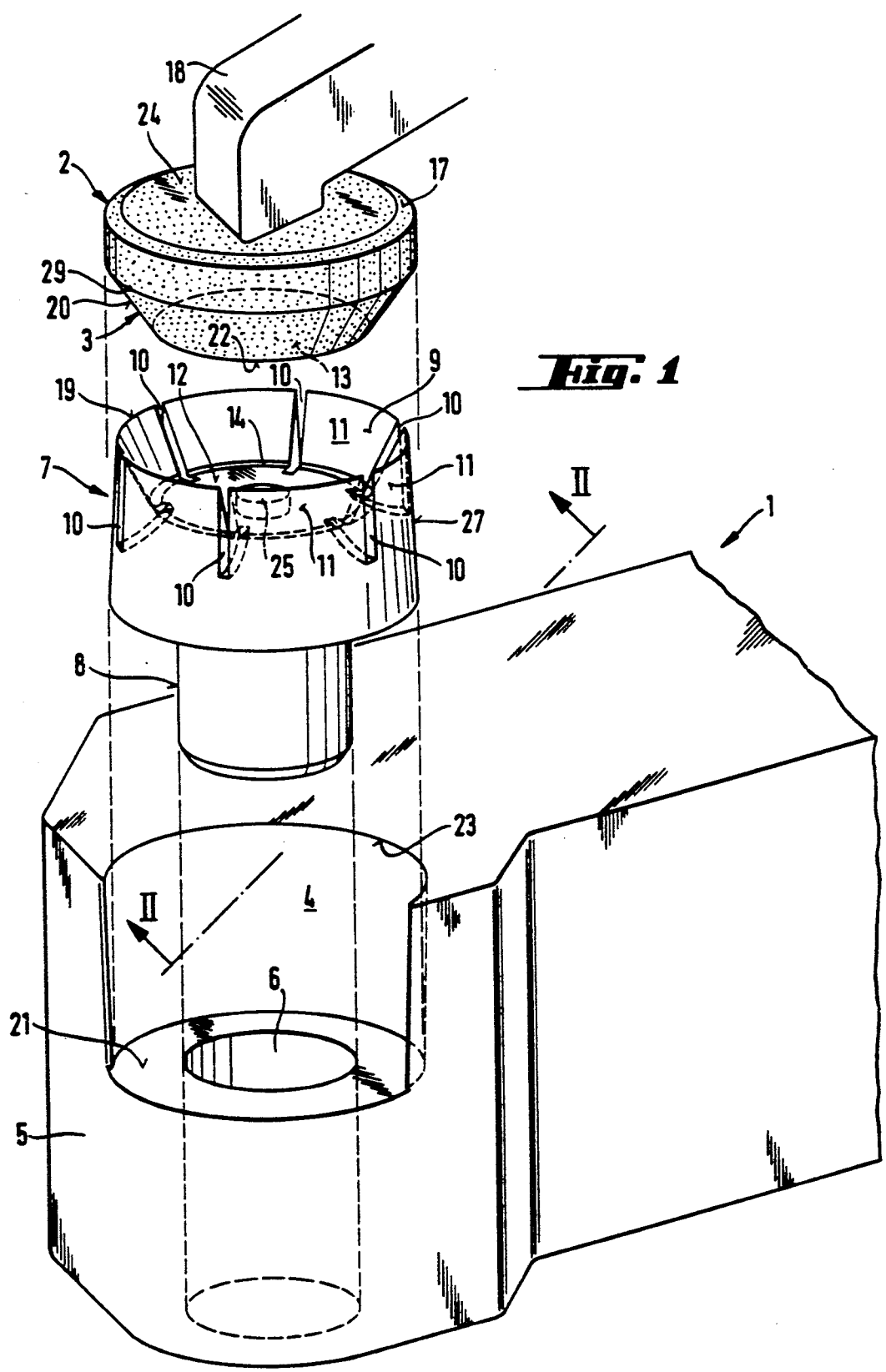
FIG. 1 is an exploded perspective of a clamp, an insert, and a circular cutting tool.

The clamp (1) has an angular clamp head (5) with a recess (4) to support the cup-shaped insert (7). A bearing bore (6) to hold the cylindrical projection (8) of the cup-shaped insert (7) extends downwardly from the surface (21) of the recess (4).

Figure 4:
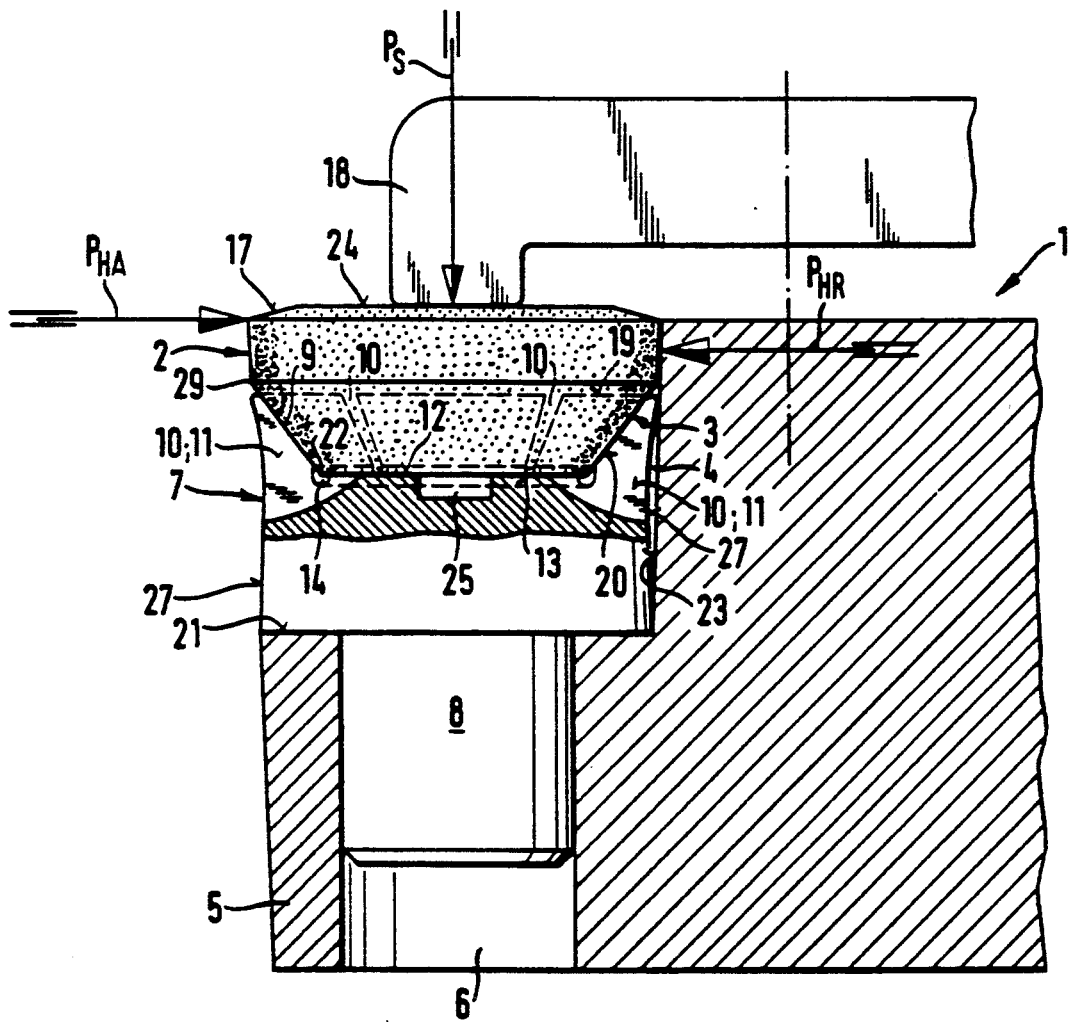
FIG. 4 is a vertical section of the configuration of FIG. 1 while clamping.
Figure 5:
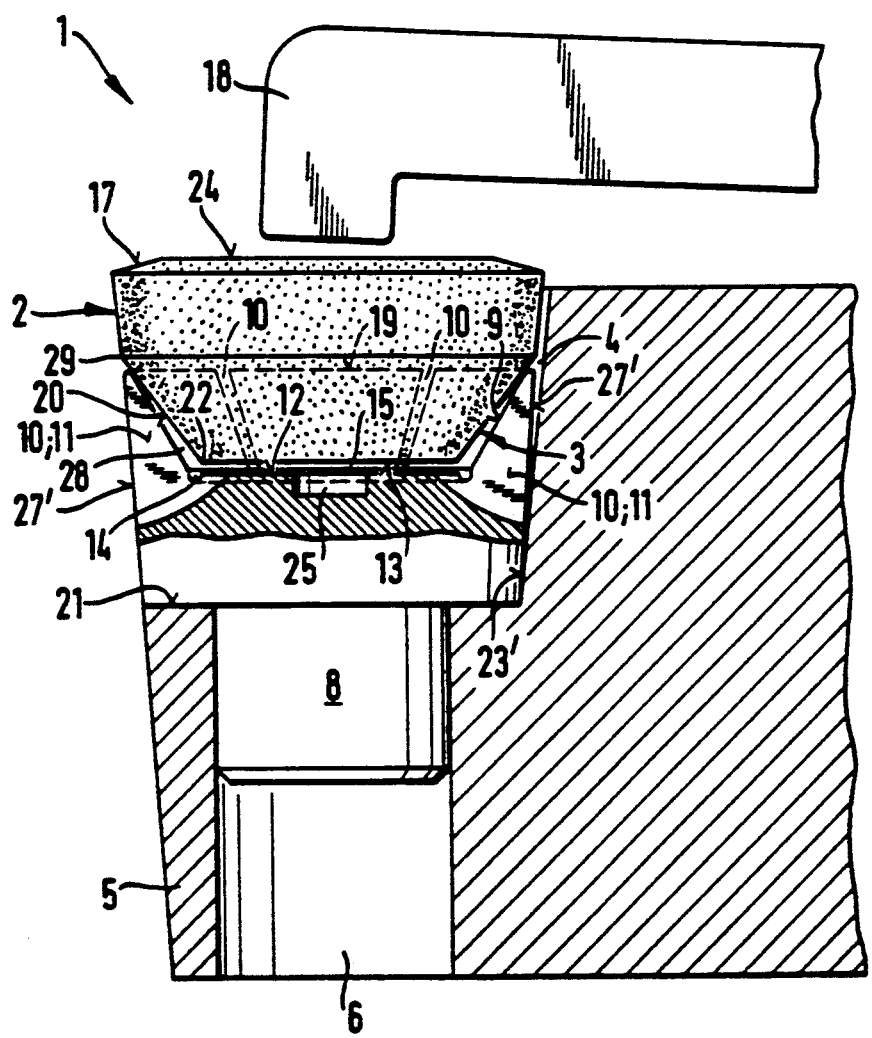
FIG. 5 is a vertical section of a modified embodiment before clamping with the clamping shoe.

The cup-shaped insert (7) includes a cylindrical projection (8) on top of which the receptacle (9) is disposed. As represented in FIGS. 1, 2, and 4, the external profile (27, 17') of the receptacle (9) can narrow towards the top like a truncated cone; the external profile (27, 27') can also have the form of a cylinder or, as represented in FIGS. 5, 6 to 9, a truncated cone narrowing from top to bottom.

Figure 7:
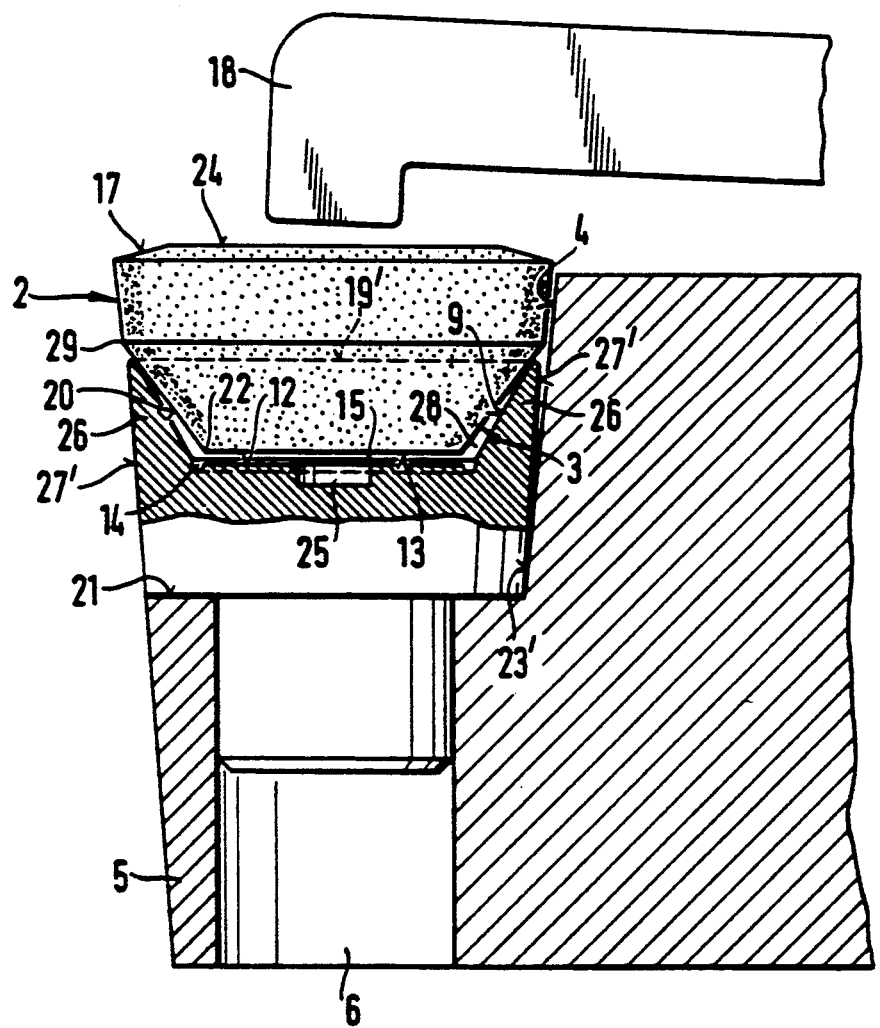
FIG. 7 shows an embodiment with cuts in the receptacle prior to compression.
Figure 8:
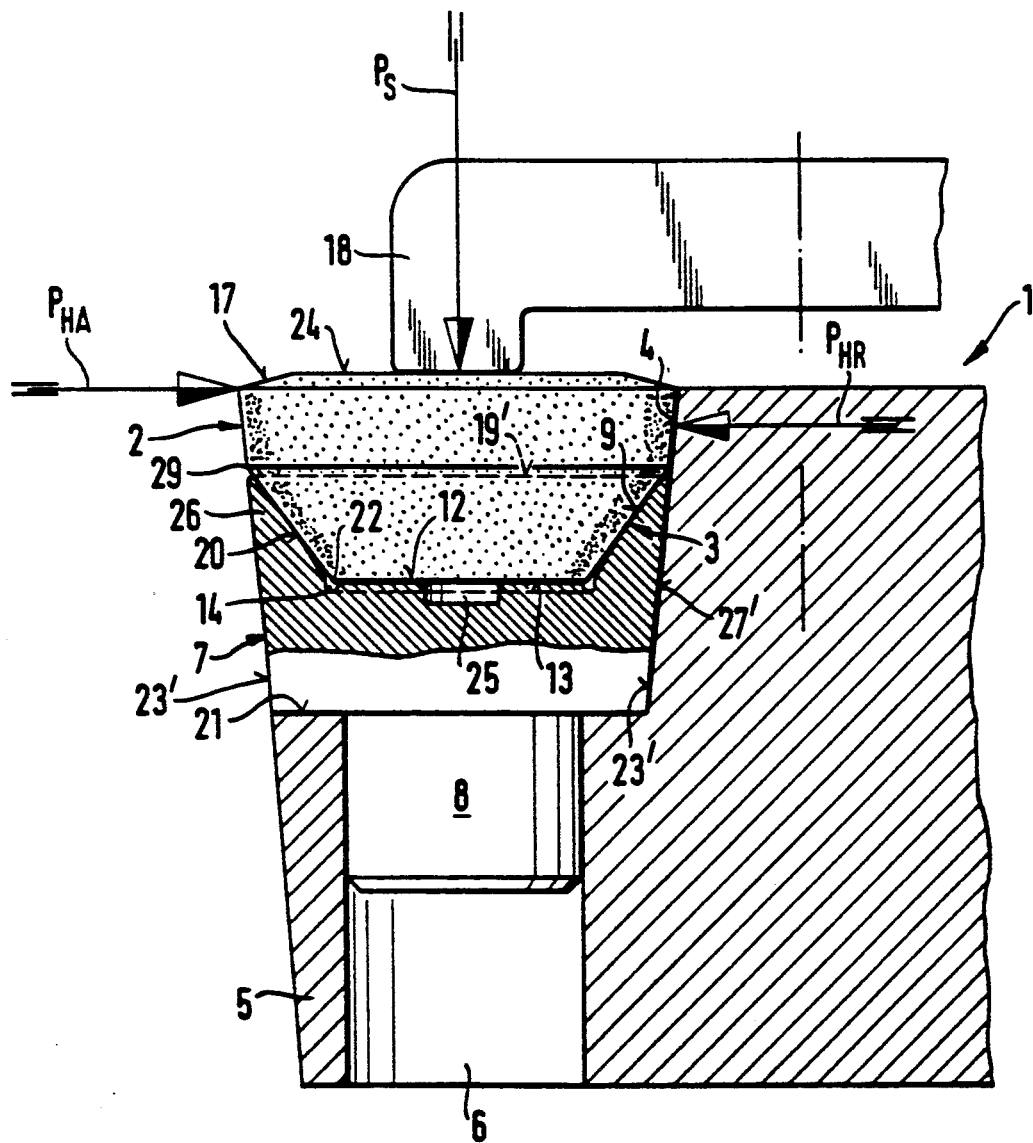
FIG. 8 shows the embodiment according to FIG. 7 under compression.
Figure 9:
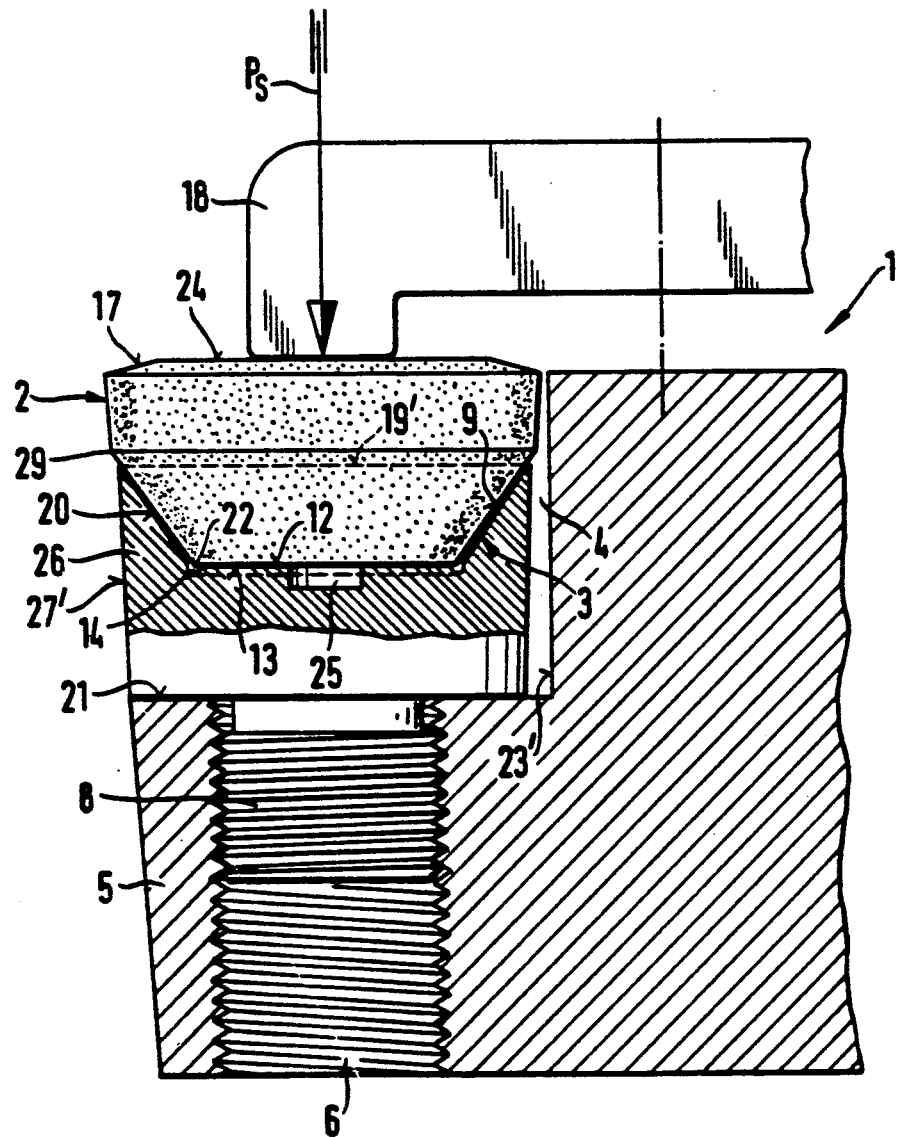
FIG. 9 shows a further embodiment under compression.

If the cup-shaped insert (7) is made of sufficiently elastic material, the receptacle (4) can be provided with a rim (19') without cuts as shown in FIGS. 7 to 9. As shown in FIG. 7, when the circular cutting tool (2) is inserted, the centering profile (3) shaped as a truncated cone rests on the rim (19'). This results in a clearance (15) between the bottom (12) of the recess in receptacle (9) and the contact surface (13) of the circular cutting tool (2). At the same time, an air gap (28) is created between the surface (20) of the truncated cone and the interior wall of the funnel (9).

As represented in FIGS. 1, 2, 4, 5 and 6, the receptacle (9) is separated by cuts (10) into spring segments (11). The cuts (10) extend through the circular groove (14) which is provided in the rim zone of the bottom (12). With the recess (25) in bottom (12), the bottom (12) forms an annular support for the contact surface (13) of the circular cutting tool (2). If the clamping shoe (18) is lowered down to the top surface (24) of the circular cutting tool (2) which is surrounded by a chamber (17) by tightening the clamping screw which is not represented and the clamping screw is then tightened further, the clamping force $P_s$ (FIG. 8) presses down the circular cutting tool until the contact surface (13) is on bottom (12) and the lower edge (22) of the centering profile (3) is supported over circular groove (14). The rim (19, 19') of receptacle (9) is expanded. The form of gap (16), represented in FIG. 2, between the cup-shaped insert (7) and the wall (23) of recess (4) is modified as shown strongly simplified in FIG. 4. The surrounding edge (29) of the centering profile (3) rises above the funnel rim (19, 19') and runs parallel thereto. Since the exterior diameter of the rim (19, 19') is smaller than the diameter of the edge (29) of the circular cutting tool and the cup-shaped insert (7) narrows downward from the rim (19, 19') at an angle greater than the conic recess in receptacle (9), the cup-shaped insert (7) does not interfere with the centering profile (3) of the circular cutting tool (2).

Figure 6:
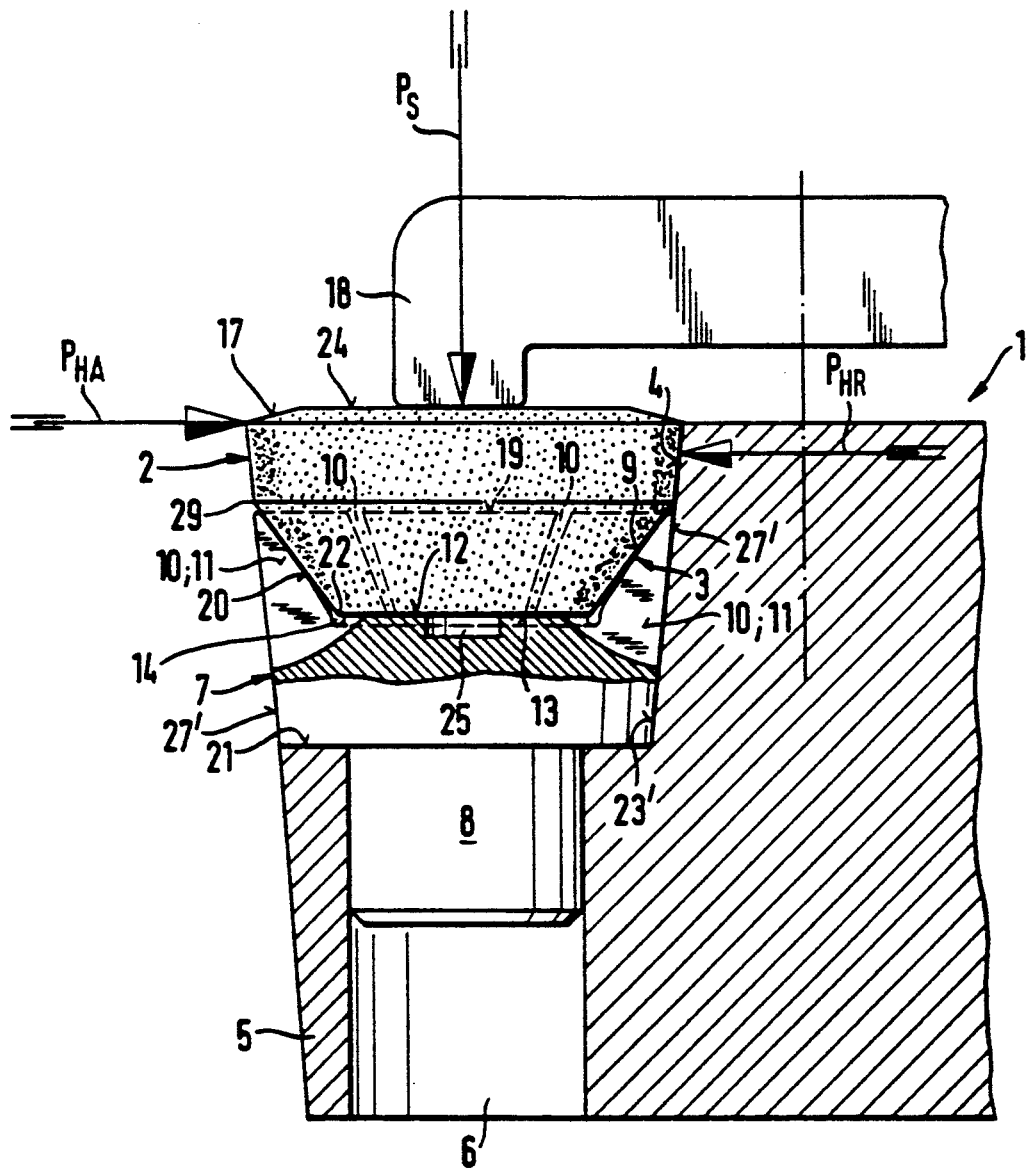
FIG. 6 shows the embodiment according to FIG. 5 under compression.

As shown in FIGS. 4, 6, and 8, the lower region of circular cutting tool (2) rests with its circumference against the lateral wall (23, 23') of the recess (4). As represented in FIGS. 4, 6, and 8, the horizontal force component $P_{HA}$ which applies to the circular cutting tool (2) is taken up by the cylindrical recess (4), as reaction force $P_{HR}$.

For clamping with such clamps (1) designed to hold smaller circular cutting tools (2), i.e. holding circular cutting tools with a diameter up to 12 mm, it suffices to insert the circular cutting tool (2) into the cup-shaped insert. This permits a larger recess (4) in the clamp (1), i.e. a more coarse tolerance such that there is play between the circumference of the circular cutting tool (2) and the recess (FIG. 9), which is in this case configured as a cylindrical recess. This embodiment also shows the bearing bore 6 having an internal thread for cooperation with an external thread on the cylindrical projection 8, here configured as a machine screw.

We claim:

1. A clamp for a circular cutting tool of the type having a circular bottom contact surface and a centering profile configured as a truncated cone which converges at a cone angle toward said bottom contact surface, said clamp comprising a clamp head having a bearing bore, an insert having a cylindrical projection profiled to fit in said bore and an elastically deformable receptacle having a recess profiled as a truncated cone, said recess having a rim and a circular bottom, said recess converging from said rim toward said bottom at a cone angle which is smaller than the cone angle of the centering profile by 1 to 5 degrees.

2. A clamp as in claim 1 wherein said cylindrical projection is a machine screw.

3. A clamp as in claim 1 wherein said cylindrical projection has an external thread and said bearing bore has an internal thread.

4. A clamp as in claim 1 wherein said receptacle comprises a plurality of spring segments separated by radial cuts.

5. A clamp as in claim 1 wherein the bottom of said recess has a diameter larger than the diameter of said bottom contact surface.

6. A clamp as in claim 1 wherein the bottom of said recess is provided with a circumferential groove.

7. A clamp as in claim 6 wherein said receptacle comprises a plurality of spring segments separated by radial cuts, said cuts extending from said rim to said circumferential groove.

8. A clamp in accordance with claim 4 wherein the width of the spring segments is between 0.4 and 15.0 mm.

* * * * *